United States Patent
Teng et al.

(10) Patent No.: US 8,165,353 B2
(45) Date of Patent: Apr. 24, 2012

(54) COMPUTER SYSTEM AND METHOD FOR CALCULATING STRAIGHTNESS OF FACIAL

(75) Inventors: Chin-Yuan Teng, Taipei (TW);
Hsiu-Ling Chiu, Taipei (TW);
Wen-Shiu Hsu, Taipei (TW);
Kuo-Hsiang Sun, Taipei (TW)

(73) Assignee: ASUSTeK Computer Inc., Taipei (TW)

( * ) Notice: Subject to any disclaimer, the term of this patent is extended or adjusted under 35 U.S.C. 154(b) by 1147 days.

(21) Appl. No.: 11/969,226

(22) Filed: Jan. 4, 2008

(65) Prior Publication Data
US 2008/0170790 A1 Jul. 17, 2008

(30) Foreign Application Priority Data
Jan. 17, 2007 (TW) .............................. 96101756 A

(51) Int. Cl.
G06K 9/00 (2006.01)
G06K 9/34 (2006.01)
G06K 9/46 (2006.01)

(52) U.S. Cl. ......... 382/118; 382/117; 382/173; 382/190

(58) Field of Classification Search .................. 382/118, 382/100, 115, 181, 190, 195, 117, 162, 167, 382/173, 209, 103; 345/501, 158, 418, 629, 345/634, 530; 348/169, 61, 143, 649, 652; 375/E7.081, E7.083, E7.211, E7.263, E7.111; 606/42; 442/206; 446/220, 221, 223, 226; 139/383 A; 428/16
See application file for complete search history.

(56) References Cited

U.S. PATENT DOCUMENTS

| 6,633,655 | B1 * | 10/2003 | Hong et al. | 382/118 |
| 7,027,622 | B2 * | 4/2006 | Pengwu | 382/118 |
| 7,426,287 | B2 * | 9/2008 | Yoon et al. | 382/118 |
| 2005/0135679 | A1 | 6/2005 | Yoon et al. | |
| 2005/0181612 | A1 | 8/2005 | Brask et al. | |

* cited by examiner

Primary Examiner — Sheela Chawan
(74) Attorney, Agent, or Firm — Jianq Chyun IP Office

(57) ABSTRACT

A computer system and a method for calculating straightness of facial are provided. In the method, an image is processed to obtain a facial area and eyes locations. The facial area is divided into two sub-areas. Then, each of the sub-area and the corresponding symmetric image thereof are coupled together to form two reference images. Finally, the characteristic values of the facial area and two of the reference images are used for calculating the straightness of the facial area based on the principle of facial symmetry. As a result, the judgment on the straightness of the facial in an image can be more correct and objective, and the situation of taking an image with a tilted angle of facial can be avoided.

11 Claims, 4 Drawing Sheets

COMPUTER SYSTEM AND METHOD FOR CALCULATING STRAIGHTNESS OF FACIAL

CROSS-REFERENCE TO RELATED APPLICATION

This application claims the priority benefit of Taiwan application serial no. 96101756, filed on Jan. 17, 2007. The entirety of the above-mentioned patent application is hereby incorporated by reference herein and made a part of this specification.

BACKGROUND OF THE INVENTION

1. Field of the Invention

The invention relates to a method for calculating facial straightness and, more particularly, to a method for calculating whether a facial area in an image is straight by comparing characteristic values.

2. Description of the Related Art

With the development of the Internet, all kinds of peripheral devices are weeding through the old to bring for the new, and further they are becoming one of indispensable tools of the modern life. Video communication via a web cam can instantaneously transmit video frames to the other end of the communication, which not only makes people's communication not limited by time and space, but also provides a very convenient channel of the communication. Besides capturing the video frames, the web cam can also pick up static image, and therefore it can be used as a common tool for taking pictures.

However, the situation that a user takes a picture by himself using a web cam is different from having a professional to take a picture for him in a studio. In the studio, the professional helps to determine whether a facial angle of the user is tilted or not. When the user is taking a picture by himself using the web cam, he needs not only taking the picture and noticing the lens location simultaneously, but also confirming whether his own sitting posture is straight via the display. In this situation, it may affect the user's posture and expression that he has to notice the lens, examine the display, and operate keys at the same time. Therefore the result of taking the picture using the web cam hardly satisfies the user.

Furthermore, letting the user determine whether the picture taken is straight by himself not only time consuming but also imprecise and not objective due to the influence of the environment and his subjective sense.

SUMMARY OF THE INVENTION

Therefore, the invention provides a method of calculating facial straightness by comparing characteristic values of the facial area and a reference image in an image, so that judgment on the straightness of the facial area in the image can be more correct and objective.

The invention provides a computer system capable of automatically calculating facial straightness in an image to increase probability of taking a clear and complete image.

The invention provides a method of calculating facial straightness, and the method includes the following steps of: first, capturing an image and obtaining a facial area and locations of eyes of the image. Then the facial area is divided into a first sub-area and a second sub-area. A first symmetric sub-area symmetrical to the first sub-area is produced, and the first sub-area is coupled with the first symmetric sub-area to form a reference image. Then a first characteristic value of the facial area and a second characteristic value of the reference image are obtained. Straightness of the facial area is calculated according to the first characteristic value and the second characteristic value.

In a preferred embodiment, the first sub-area and the second sub-area may be a left facial area and a right facial area of the facial area, respectively.

In a preferred embodiment, the step of dividing the facial area into the first sub-area and the second sub-area may further include obtaining a rectangular block which is the smallest one enclosing the facial area. A dividing line may be determined according to the locations of the left-eye and the right-eye and then the rectangular block may be divided into the first sub-area and the second sub-area according to the dividing line.

In a preferred embodiment, the step of calculating the straightness of the facial area according to the first characteristic value and the second characteristic value may include treating a difference between the first characteristic value and the second characteristic value as the straightness.

In a preferred embodiment, after the step of calculating the straightness of the facial area according to the first characteristic value and the second characteristic value, the method may further include providing a user with the straightness of the facial area.

In a preferred embodiment, the method may further include producing a second symmetric sub-area symmetrical to the second sub-area. The second sub-area may be coupled with the second symmetric sub-area to form a second reference image, and a third characteristic value of the second reference image may be obtained. The straightness of the facial area may be calculated according to the first characteristic value, the second characteristic value, and the third characteristic value.

In a preferred embodiment, the step of calculating the straightness of the facial area according to the first characteristic value, the second characteristic value, and the third characteristic value may further include calculating a first difference between the first characteristic value and the second characteristic value and calculating a second difference between the first characteristic value and the third characteristic value. Then the straightness may be calculated according to the first difference and the second difference.

In a preferred embodiment, the step of calculating the straightness according to the first difference and the second difference may include treating an average value of the first difference and the second difference as the straightness.

In a preferred embodiment, after the step of calculating the straightness of the facial area according to the first characteristic value, the second characteristic value, and the third characteristic value, the method may further include providing a user with the straightness of the facial area.

Further, the invention provides a computer system including an image capture unit and a processing unit. The image capture unit is used for capturing an image. The processing unit connects to the image capture unit and is used for executing an application for obtaining a facial area and locations of eyes of the image, dividing the facial area into a first sub-area and a second sub-area, producing a first symmetric sub-area symmetrical to the first sub-area, coupling the first sub-area with the first symmetric sub-area to form a reference image, and obtaining a first characteristic value of the facial area and a second characteristic value of the reference image to calculate straightness of the facial area according to the first characteristic value and the second characteristic value.

In a preferred embodiment, the first sub-area and the second sub-area may be a left facial area and a right facial area of the facial area, respectively.

In a preferred embodiment, the processing unit may obtain a rectangular block which is the smallest one enclosing the facial area. A dividing line of the rectangular block may be determined according to the locations of eyes and then the rectangular block may be divided into the first sub-area and the second sub-area according to the dividing line.

In a preferred embodiment, the processing unit may calculate a difference between the first characteristic value and the second characteristic value to treat the difference as the straightness.

In a preferred embodiment, the processing unit may produce a second symmetric sub-area symmetrical to the second sub-area. The second sub-area may be coupled with the second symmetric sub-area to form a second reference image, and then a third characteristic value of the second reference image may be obtained. The straightness of the facial area may be calculated according to the first characteristic value, the second characteristic value, and the third characteristic value.

In a preferred embodiment, the step for the processing unit to calculate the straightness of the facial area may further include calculating a first difference between the first characteristic value and the second characteristic value and calculating a second difference between the first characteristic value and the third characteristic value. Then the straightness may be calculated according to the first difference and the second difference.

In a preferred embodiment, the processing unit may calculate an average value of the first difference and the second difference to treat the average value as the straightness.

In a preferred embodiment, the computer system may further include a display unit connecting to the processing unit for displaying the straightness.

In the invention, the facial area is divided into two sub-areas first; then the reference image is formed by the sub-area and its symmetric image; finally the straightness of the facial area is calculated by comparing the characteristic values of the facial area and the reference image based on the principle of facial symmetry. As a result, judgment on the straightness of the facial area in an image can be more correct and objective, and the situation of taking an image with a tilted angle of the facial area can be avoided.

These and other features, aspects, and advantages of the present invention will become better understood with regard to the following description, appended claims, and accompanying drawings.

DETAILED DESCRIPTION OF THE EMBODIMENTS

Figure 1:
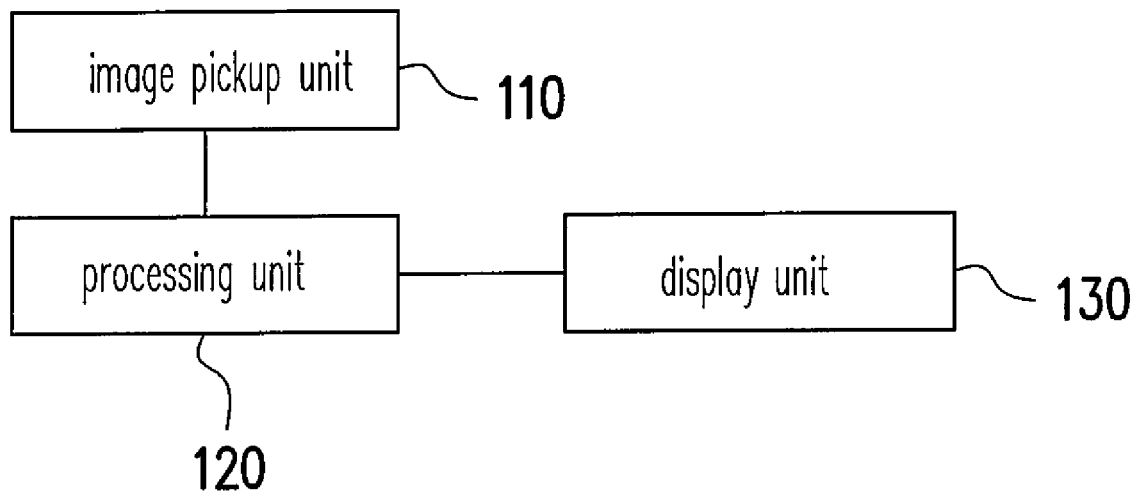
FIG. 1 is a diagram showing a computer system according to a preferred embodiment of the invention.

FIG. 1 is a diagram showing a computer system according to a preferred embodiment of the invention. Please referring to FIG. 1, a computer system 100 includes an image capture unit 110, a processing unit 120, and a display unit 130. The image capture unit 110 is used for capturing an image, while the processing unit 120 connecting to the image capture unit 110 obtains a facial area from the image and calculates straightness of the facial area. The display unit 130 is used for displaying the straightness calculated by the processing unit 120 to prompt a user whether the facial area is straight.

Figure 2:
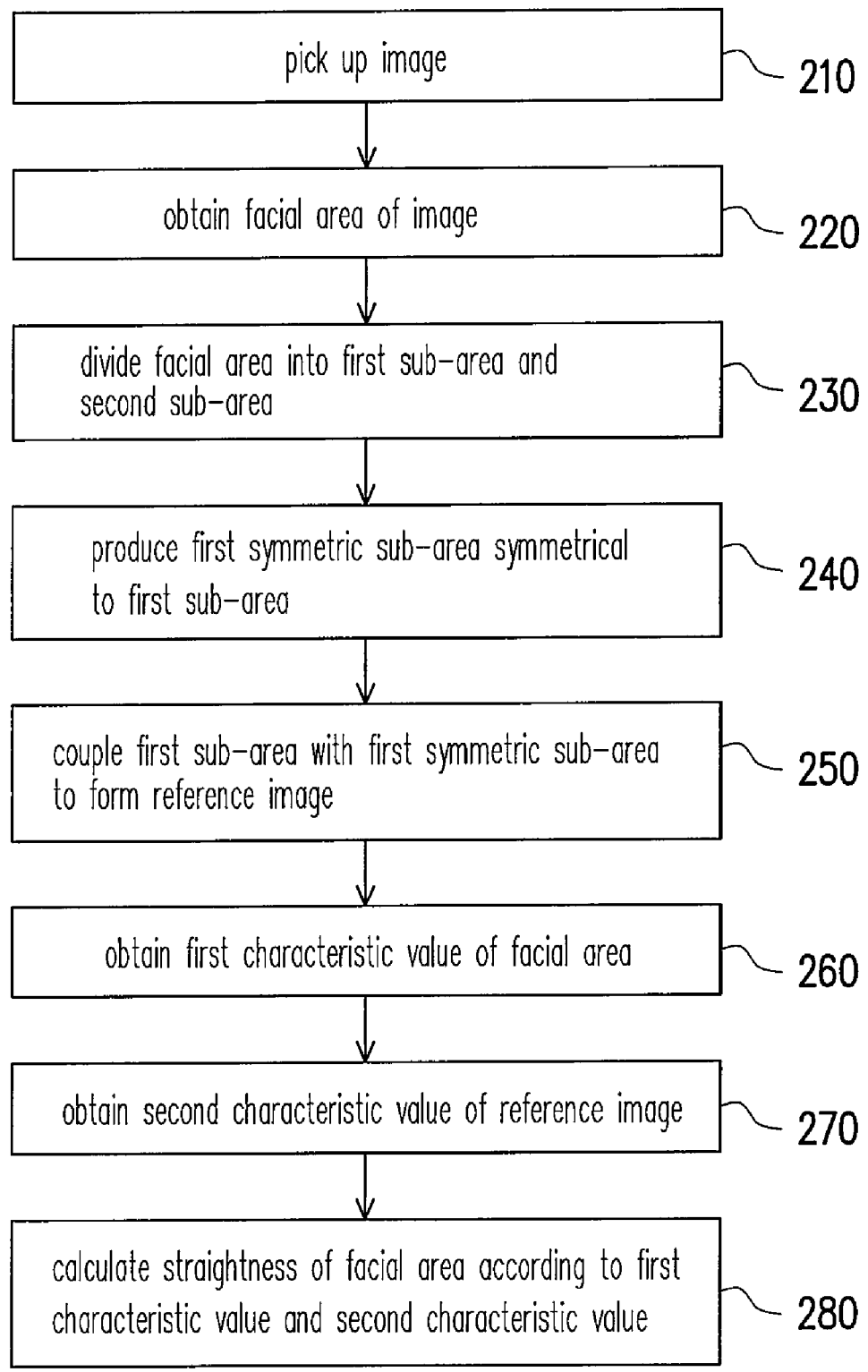
FIG. 2 is a flow chart showing a method of calculating facial straightness according to a preferred embodiment of the invention.

FIG. 2 is a flow chart showing a method of calculating facial straightness according to a preferred embodiment of the invention. Please referring to FIG. 1 and FIG. 2 together, first, in step 210, a user captures an image by using the image capture unit 110 (such as a web cam) of the computer system 100.

Then in step 220, the processing unit 120 obtains a facial area and locations of two eyes in the image using the technique of facial detecting. In this embodiment, the facial detecting method may be the Haar-cascade facial detecting method, which compares the picked-up image with a collection of a group of facial features and obtains the facial area and the locations of eyes in the facial area by searching the area closest to the face in the image. However, the above detecting method is not for limiting the invention and persons having ordinary skill in the art may choose different facial detecting methods if necessary.

Figure 3:
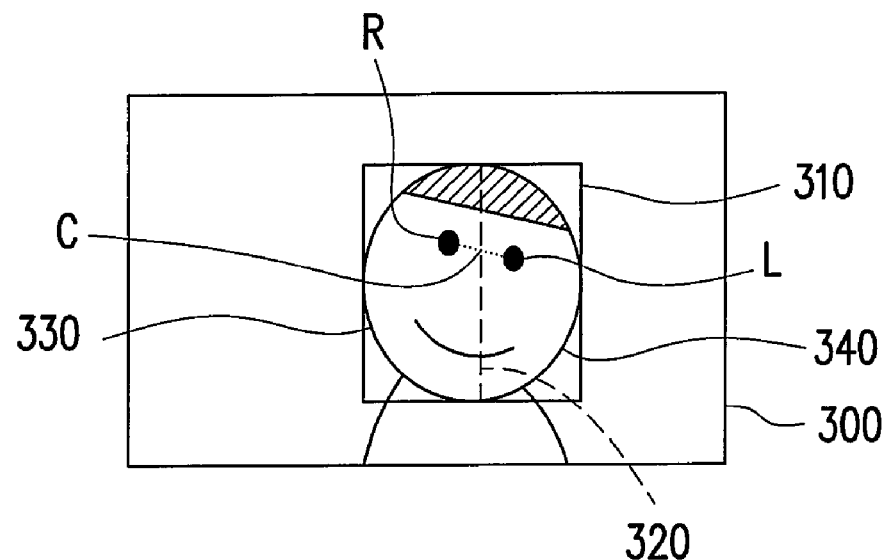
FIG. 3 is a diagram showing an image according to a preferred embodiment of the invention.

In step 230, the processing unit 120 divides the facial area into a first sub-area and a second sub-area, wherein the first sub-area and the second sub-area may be a left facial area and a right facial area of the facial area, respectively. Below are detailed steps of dividing the facial area in this embodiment. Please referring to FIG. 3, first, a rectangular block 310 which is the smallest one enclosing the facial area is obtained from an image 300. Second, a dividing line 320 is determined according to locations of eyes. In this embodiment, the locations of left-eye L and right-eye R are determined first, and then a location of a midpoint C between the left-eye L and the right-eye R is calculated. A vertical line passing through the midpoint C is the dividing line 320 in this embodiment. Therefore the dividing line 320 divides the facial area into a first sub-area 330 and a second sub-area 340. Although this embodiment uses the right facial area as the first sub-area 330 to continue the following steps, the invention is not limited thereto. For example, those who practice the invention can also use the left facial area as the first sub-area to continue the following steps.

Figure 4:
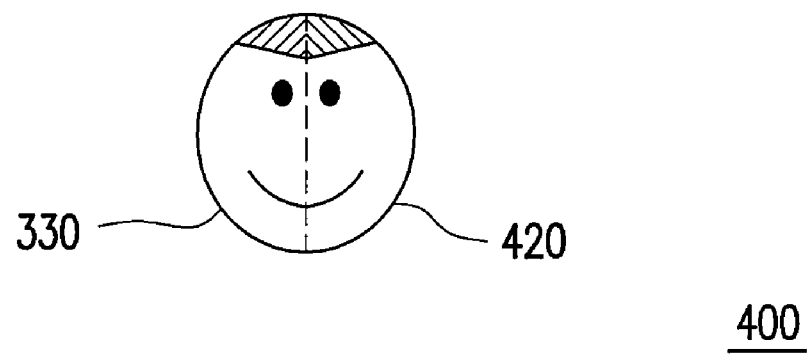
FIG. 4 is a diagram showing a reference image according to a preferred embodiment of the invention.

Next please refer to FIG. 2 and FIG. 4 together. After the step of dividing the facial area, in step 240, the processing unit 120 produces a first symmetric sub-area 420 symmetrical to the first sub-area 330 by, for example, mirroring. In step 250, the first sub-area 330 is coupled with the first symmetric sub-area 420 to form a reference image 400.

In step 260, the processing unit 120 obtains facial features (such as locations of the five sense organs) of the facial area to treat them as a first characteristic value corresponding to the facial area. In step 270, a second characteristic value corresponding to the reference image is obtained. Note that whether the facial area is straight has nothing to do with colors of the image, and therefore in this embodiment, the image can be turned into gray scale first. Then brightness of a special point in the gray scale image can replace the RGB color thereof to be the characteristic value to reduce the characteristic value and to speed up the calculation.

Finally, in step 280, the processing unit 120 calculates straightness of the facial area according to the first characteristic value and the second characteristic value. In this embodiment, the method of calculating the straightness of the facial area includes treating a difference between the first characteristic value and the second characteristic value as the straightness. Below are detailed steps of calculating the difference. For convenience, the first characteristic value and the second characteristic value are both assumed to be 801 bytes, and each byte represents information taken from a special point in the facial area. The first bytes (that is the first special points) of the first characteristic value and the second characteristic value are assumed to be 10000000 and 00001111, respectively, and then the byte difference of the first bytes between them is 128−15=113. In this embodiment, the byte difference is defined between 0 and 2, and therefore 113 is normalized to be 0.886 (that is 113/255×(2−0)). After calculating the byte differences of the 801 bytes respectively, the difference between the first characteristic value and the second characteristic value is obtained by averaging the sums thereof.

Generally speaking, when the user faces the web cam to take a picture, if the user faces the camera without tilting, the reference image should be similar to the original image due to the symmetry of the face. That is, the difference between the first characteristic value and the second characteristic value obtained according to the above method should be small, which represents that the straightness of the facial area is high. On the other hand, if the tilted angle of the facial area (such as a side angle) is large, then the reference image obtained may differ completely from the facial area in appearance, and therefore the difference between the first characteristic value and the second characteristic value may be large (that is, the straightness is low). The straightness of the facial area can be calculated according to the above method, and it may be displayed to the user by the display unit 130, so that the user may be prompted in a more objective way to adjust the facial angle to take an image with straight face.

Figure 5:
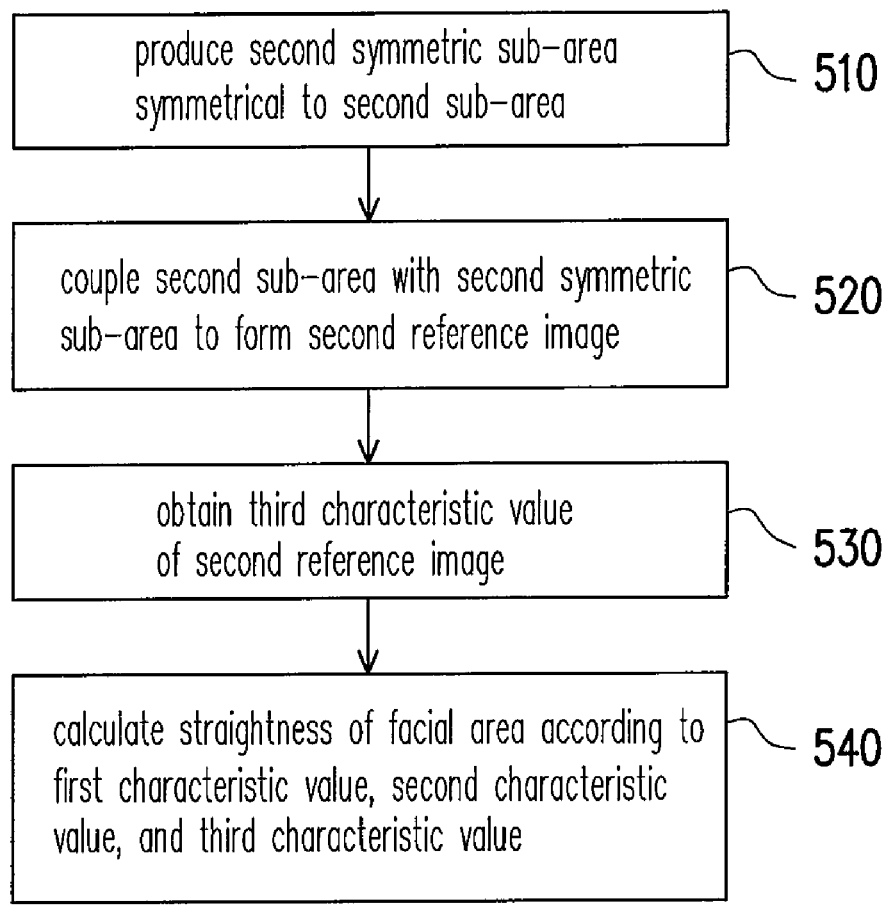
FIG. 5 is a flow chart showing a method of calculating facial straightness according to another preferred embodiment of the invention.
Figure 6:
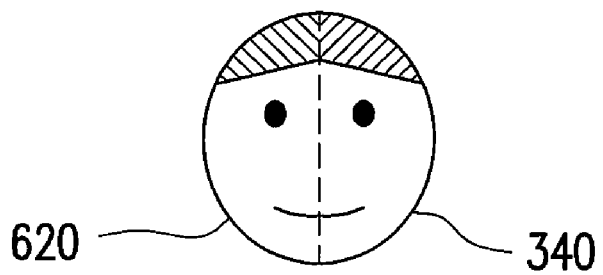
FIG. 6 is a diagram showing a reference image according to another preferred embodiment of the invention.

In another embodiment, a first sub-area and a second sub-area, divided from a facial area, are used to calculate straightness of the facial area together. FIG. 5 is a flow chart showing a method of calculating facial straightness according to another preferred embodiment of the invention. Please refer to FIG. 5 and FIG. 6 together. Continuing with the above example, in this embodiment, the processing unit 120, besides obtaining the facial area of the image, producing the first symmetric sub-area, and obtaining the first characteristic value and the second characteristic value respectively corresponding to the facial area and the reference image, produces a second symmetric sub-area 620 symmetrical to the second sub-area 340 shown in step 510. In step 520, the second sub-area 340 is coupled with the second symmetric sub-area 620 to form a second reference image 600. Then in step 530, a corresponding third characteristic value is obtained according to the second reference image 600. Finally in step 540, the straightness of the facial area can be calculated according to the first characteristic value, the second characteristic value, and the third characteristic value obtained in such a way as the above embodiment describes. The display unit 130 may display the straightness to provide the user with the straightness degree of the facial area.

In this embodiment, the method of calculating the straightness of the facial area includes calculating a first difference between the first characteristic value and the second characteristic value first, and then calculating a second difference between the first characteristic value and the third characteristic value. Finally an average value of the first difference and the second difference can be used as the straightness of the image. Since the method of calculating the differences between the characteristic values is identical with that in above embodiment, here it is no longer repeated.

This embodiment judges whether the facial area is straight by comparing the difference degrees among the three characteristic values. It is easily understood that when the facial area does not tilt, the difference degrees among the three characteristic values are low; when the facial area tilts little, the difference degrees among the three characteristic values may greatly increase. The straightness calculated according to the above method can prompt the user to adjust the facial angle to take a straighter image.

As described above, the method and system for calculating facial straightness according to the invention are based on the principle of facial symmetry, wherein the left sub-area and the right sub-area are obtained by dividing the facial area according to the locations of eyes, and after the reference images symmetrical to the above two sub-areas are produced in the mirrored way, the straightness of the facial area can be calculated by comparing the characteristic values of the reference images and the original facial area to objectively and correctly prompt the user whether the facial area is straight, so that taking an image can be more efficient and the result can be better.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. A method for calculating facial straightness, comprising:
capturing an image;
obtaining a facial area and locations of eyes of the image;
dividing the facial area into a first sub-area and a second sub-area according to the locations of eyes;
producing a first symmetric sub-area symmetrical to the first sub-area;
coupling the first sub-area with the first symmetric sub-area to form a reference image;
obtaining a first characteristic value of the facial area;
obtaining a second characteristic value of the reference image;
producing a second symmetric sub-area symmetrical to the second sub-area;
coupling the second sub-area with the second symmetric sub-area to form a second reference image;
obtaining a third characteristic value of the second reference image; and
calculating straightness of the facial area according to the first characteristic value, the second characteristic value, and the third characteristic value.

2. The method according to claim 1, wherein the first sub-area is a left facial area of the facial area and the second sub-area is a right facial area of the facial area.

3. The method according to claim 1, wherein the step of dividing the facial area further comprises:
obtaining a rectangular block which is the smallest one enclosing the facial area;
determining a dividing line of the rectangular block according to the locations of eyes; and
dividing the rectangular block into the first sub-area and the second sub-area according to the dividing line.

4. The method according to claim 1, wherein the step of calculating the straightness of the facial area further comprises:
calculating a first difference between the first characteristic value and the second characteristic value;

calculating a second difference between the first characteristic value and the third characteristic value; and calculating the straightness according to the first difference and the second difference.

5. The method according to claim 4, wherein the step of calculating the straightness according to the first difference and the second difference comprises:

treating an average value of the first difference and the second difference as the straightness.

6. A computer system, comprising:

an image capture unit for capturing an image; and a processing unit connecting to the image capture unit for obtaining a facial area and locations of eyes of the image, dividing the facial area into a first sub-area and a second sub-area, producing a first symmetric sub-area symmetrical to the first sub-area, coupling the first sub-area with the first symmetric sub-area to form a reference image, and obtaining a first characteristic value of the facial area and a second characteristic value of the reference image respectively, wherein the processing unit produces a second symmetric sub-area symmetrical to the second sub-area, couples the second sub-area with the second symmetric sub-area to form a second reference image, and then obtains a third characteristic value of the second reference image to calculate straightness of the facial area according to the first characteristic value, the second characteristic value, and the third characteristic value.

7. The computer system according to claim 6, wherein the first sub-area is a left facial area of the facial area and the second sub-area is a right facial area of the facial area.

8. The computer system according to claim 6, wherein the processing unit obtains a rectangular block which is the smallest one enclosing the facial area, determines a dividing line of the rectangular block according to the locations of eyes, and divides the rectangular block into the first sub-area and the second sub-area according to the dividing line.

9. The computer system according to claim 6, wherein the processing unit calculates a first difference between the first characteristic value and the second characteristic value and a second difference between the first characteristic value and the third characteristic value, and then calculates the straightness according to the first difference and the second difference.

10. The computer system according to claim 9, wherein the processing unit calculates an average value of the first difference and the second difference to treat the average value as the straightness.

11. The computer system according to claim 6, further comprising:

a display unit connecting to the processing unit for displaying the straightness.

* * * * *